United States Patent [19]

Beall et al.

[11] Patent Number: 4,464,475

[45] Date of Patent: Aug. 7, 1984

[54] GLASS-CERAMIC ARTICLES CONTAINING OSUMILITE

[75] Inventors: George H. Beall, Big Flats; Agustin M. Chirino, Elmira; Kenneth Chyung, Painted Post; Francis W. Martin; Mark P. Taylor, both of Painted Post, all of N.Y.

[73] Assignee: Corning Glass Works, Corning, N.Y.

[21] Appl. No.: 457,652

[22] Filed: Jan. 13, 1983

[51] Int. Cl.³ .............................................. C03C 3/22
[52] U.S. Cl. ............................................. 501/9; 501/8
[58] Field of Search ........................................ 501/8, 9

[56] References Cited

U.S. PATENT DOCUMENTS

| | | | |
|---|---|---|---|
| 2,920,971 | 1/1960 | Stookey | 501/8 |
| 3,480,452 | 11/1969 | Fleischner et al. | 501/9 |
| 3,573,939 | 4/1971 | Beall | 501/5 |
| 3,713,854 | 1/1973 | Beall | 501/9 |
| 3,839,053 | 10/1974 | Rittler | 501/8 |

FOREIGN PATENT DOCUMENTS

| | | | |
|---|---|---|---|
| 1459178 | 12/1976 | United Kingdom | 501/9 |
| 1535202 | 12/1978 | United Kingdom | 501/8 |

Primary Examiner—Mark Bell
Attorney, Agent, or Firm—C. S. Janes, Jr.

[57] ABSTRACT

This invention is directed to the production of glass-ceramic bodies exhibiting high strength and capable of being used at temperatures of 1300° C. and higher. Barium osumilite constitutes the predominant crystal phase and the inventive bodies have overall compositions consisting essentially, in weight percent, of:

| | |
|---|---|
| $SiO_2$ | 51–68 |
| $Al_2O_3$ | 17.5–30 |
| MgO | 5–12 |
| BaO | 3.5–15 |
| Si | 0–1 |
| $Nb_2O_5$ | 0–20 |
| $Ta_2O_5$ | 0–10 |
| $TiO_2$ | 0–12 |
| $ZrO_2$ | 0–6 |

The bodies can be utilized in monolith form and are very useful as matrices for fiber reinforced structures suitable for high temperature applications.

5 Claims, No Drawings

GLASS-CERAMIC ARTICLES CONTAINING OSUMILITE

BACKGROUND OF THE INVENTION

The production of glass-ceramic articles had its genesis in U.S. Pat. No. 2,920,971. As is explained in that patent, a glass-ceramic article is prepared through the controlled crystallization in situ of a precursor glass body. That preparation involves three basic steps: first, a glass-forming batch commonly containing a nucleating or crystallization-promoting agent is melted; second, the melt is simultaneously cooled to a temperature below the transformation range thereof and a glass body of a desired geometry shaped therefrom; and, third, the glass body is exposed to temperatures above the annealing point and often above the softening point of the glass to generate crystals in situ. To achieve greater uniformity in crystal size, the parent glass may frequently be initially exposed to a temperature somewhat above the transformation range to develop a myriad of nuclei in the glass, following which the temperature is raised to cause the growth of crystals on those nuclei.

Glass-ceramic products have also been prepared by firing glass frits, i.e., glasses in the form of finely-divided powders, which frequently will not include a nucleating agent in their compositions. That is, surface crystallization resulting from the high surface area presented by the very finely-divided glass powders is relied upon to promote uniformly fine-grained crystallization.

In general, glass-ceramic articles are desirably highly crystalline; U.S. Pat. No. 2,920,971 specifies at least 50% crystalline. Because of this high crystallinity, glass-ceramic articles take on physical properties more closely akin to those of the crystal phase than those of the parent glass. Moreover, the composition of any residual glassy matrix will be quite dissimilar from that of the precursor glass inasmuch as the components of the crystal phase will have been removed therefrom.

Because of the wide variety of physical properties that can be enjoyed in glass-ceramic products through the many different types of crystal phases which can be developed therein, glass-ceramics have found utility in such diverse applications as radomes, dental constructs, culinary ware, printed circuit boards, dinnerware, and matrices for storage of radioactive materials.

A combination of thermal stability, thermal shock resistance, and mechanical strength is vital when a material is to be subjected to severe thermo-mechanical environments. Dielectric requirements may also dictate that the material be essentially free from alkali metals, especially sodium.

Serial No. 380,464, filed May 20, 1982 in the names of J. J. Brennan, C. K. Chyung, and M. P. Taylor under the title GLASS-CERAMIC COMPOSITIONS OF HIGH REFRACTORINESS, describes glass-ceramic compositions in the $Li_2O-MgO-Al_2O_3-SiO_2$ system which are capable of long term use at temperatures up to 1100° C., and short term exposure to 1200° C. Those glass-ceramics contained beta-spodumene and/or beta-quartz solid solution as the predominant crystal phase and had, as their principal application, service as matrices for SiC fiber reinforced composite bodies. It was observed in that disclosure that, in an oxidizing atmosphere, SiC fibers react with the matrix to deleteriously affect the strength and fracture toughness of the composite articles, primarily due to the oxidation of the SiC fibers with the concomitant generation of gaseous species resulting in fiber strength degradation. The matrix viscosity at a desired use temperature should be at least on the order of $10^{13}$ poises (the annealing point); otherwise, the load transfer through the shear strength of the matrix is too low to maintain efficient reinforcement.

As was noted above, Ser. No. 380,464 discloses glass-ceramic compositions suitable for extended use at temperatures up to 1100° C. and brief exposures to temperatures up to 1200° C. For certain applications, e.g., jet engine components, glass-ceramics sufficiently refractory to withstand long term exposures to temperatures up to 1300° C. would be highly desirable. Also, the capability of acting as a matrix for SiC fibers, i.e., there being essentially no reaction between the matrix and the SiC fibers, would be an added plus. However, to satisfy that high temperature requirement, the glass-ceramic matrix must demonstrate such refractoriness subsequent to the crystallization in situ process that the viscosity of the body is at least $10^{13}$ poises at 1300° C.

In addition, where SiC fiber-containing composites are envisioned, it is much to be preferred that the glass-ceramic exhibit a relatively low coefficient of thermal expansion and good sinterability so that the composite articles can be fabricated at relatively low temperatures and pressures (~1000° C. and ~1000 psi). Not only is good sinterability at relatively low temperatures desirable from the practical points of view of ease and cost of producing composites, but also higher temperatures hazard reactions taking place between the matrix and the SiC fibers.

The glass-ceramics of Ser. No. 380,464 consist essentially, expressed in terms of weight percent on the oxide basis, of:

| | |
|---|---|
| $Li_2O$ | 1.5–5 |
| $Al_2O_3$ | 15–25 |
| $SiO_2$ | 60–75 |
| $ZrO_2$ | 1–5 |
| $Nb_2O_5$ | 0–10 |
| $Ta_2O_5$ | 0–10 |
| $Nb_2O_5 + Ta_2O_5$ | 1–10 |
| MgO | 0–10 |

Where those compositions are to be used to fabricate composite articles with SiC fibers, $TiO_2$ will be essentially absent therefrom and 0.5–3% $As_2O_3$ will be incorporated into the composition. $TiO_2$ behaves as a flux and, hence, adversely affects the refractoriness of the product. Furthermore, $TiO_2$ appears to form titanium silicide intermetallic compounds at the interface of the SiC fiber-matrix interface during formation of the composite body, thereby leading to reduced fracture toughness in the composite.

Arsenic, added as $As_2O_5$ to the parent glass batch, substantially improves the resistance of the glass-ceramics to oxidation. It was hypothesized that, since arsenic can exist in two oxidation states, viz., $As^{+3}$ and $As^{+5}$, it acts as an oxygen buffer to trap oxygen as it migrates inwardly from the surface of the composite.

$Nb_2O_5$ and $Ta_2O_5$ enhance the refractory character of the glass-ceramics and were theorized to perhaps perform as secondary nucleants ($ZrO_2$ being the primary nucleant). More importantly, however, $Nb_2O_5$ and $Ta_2O_5$ were discovered to provide in situ protection from SiC-glass interaction through the formation of NbC and/or TaC at the SiC-glass interface and/or the development of a very thin protective layer around the SiC fiber. Whatever mechanism is involved, the NbC and/or TaC reaction product acts to restrict active oxidation of the SiC fibers at elevated temperatures and to inhibit SiC-glass interfacial reactivity. As a result, the $Nb_2O_5$ and/or $Ta_2O_5$ content in the glass-ceramic matrix will be reduced to the extent of the carbide layer.

To secure highly crystalline bodies wherein the crystals are quite uniformly fine-grained, the compositions will contain 2–3.5% $Li_2O$, 1.5–6% MgO, and 1–3% $ZrO_2$.

OBJECTIVES OF THE INVENTION

The primary objective of the instant invention is to provide glass-ceramic products capable of extended use at temperatures up to 1300° C., exhibiting relatively low coefficients of thermal expansion ($<30\times10^{-7}/°C.$), high mechanical strength and fracture toughness, and excellent dielectric properties (a dielectric constant at room temperature of about 5 and a loss tangent at microwave frequencies $<0.001$).

Another objective is to provide such glass-ceramic bodies which display excellent mechanical thermochemical stability at temperatures up to 1300° C. and higher and which do not chemically react with SiC fibers, thereby permitting the bodies to serve as matrices to be reinforced through the incorporation of SiC fibers therewithin.

SUMMARY OF THE INVENTION

Those objectives can be achieved via the production of highly crystalline glass-ceramic bodies wherein a bariumosumilite constitutes the predominant crystal phase.

The natural mineral osumilite has been studied by a number of researchers; reports of two such groups are W. C. Forbes et al., *American Mineralogist 63*, page 304 (1972) and P. Cerny et al., *Canadian Mineralogist 18*, page 41 (1980). The general formula for minerals of the osumilite (milarite) group has been stated as

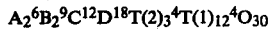

where the superscripts refer to coordination, T(1) and T(2) denote the inter-ring and ring tetrahedral positions, and A, B, C, and D are various cation sites of higher coordination located between and within double-six-membered rings, the characteristic unit of the structure.

For osumilite the B and D positions are empty; A is commonly filled by $Mg^{+2}$, C is partially or completely filled by $Ba^{+2}$ with, optionally, $K^+$, $Ca^{+2}$ and/or $Sr^{+2}$; T(2) is occupied by $Al^{+3}$; and T(1) is divided into $Si^{+4}$ and $Al^{+3}$. Consequently, the normal formula for a totally-stuffed (C-filled) Ba-osumilite is $BaO.2MgO.3Al_2O_3.9SiO_2$ or $BaMg_2Al_6Si_9O_{30}$ and the half-stuffed equivalent is

Ba-osumilite contains no alkali metal and is especially well-suited to accomplish the above objectives of the instant invention since it has a low coefficient of thermal expansion, is highly refractory, has excellent dielectric properties, and can be formed and shaped as a stable glass. This latter feature is rendered possible because, as can be seen from the mineral formula, the glass-former $SiO_2$ is the predominant oxide. Moreover, unlike cordierite ($2MgO.2Al_2O_3.5SiO_2$), a related ring silicate, osumilite glasses do not demonstrate a large volume increase when crystallized in situ; on the contrary, a slight shrinkage occurs.

Highly crystalline, Ba-osumilite articles can be prepared by two general procedures: (1) utilizing a devitrifying frit; and (2) utilizing an internal nucleating agent. In the first practice, a finely-divided glass powder (frit) is formed, the frit shaped into a desired configuration, and then fired to essentially simultaneously sinter the powder to a solid body and develop crystallization. The large surface area presented by the fine particles promotes nucleation of the crystals. In the second procedure, a nucleating agent selected from the group of silicon metal, $TiO_2$ and $Nb_2O_5$ is dissolved in the glass. Silicon metal is the most efficient nucleant in promoting osumilite crystallization. $Nb_2O_5$ is less effective but can be useful in improving the overall refractoriness of the products. $TiO_2$ is the least effective nucleant and requires careful heat treatment to achieve the desired fine-grained, highly crystalline body. $ZrO_2$ has proven to be relatively ineffective in nucleating the inventive compositions. The addition of a small amount of $Nb_2O_5$ with $TiO_2$ and/or $ZrO_2$ appears to significantly improve the nucleation efficiency of $TiO_2$ and/or $ZrO_2$. $TiO_2$ behaves as a flux at high temperatures so large amounts thereof will be avoided. Large amounts of $ZrO_2$ will also be avoided since glass melting problems can be experienced and the undesirable formation of zircon crystals in the glass-ceramic product is hazarded. The above-described combination of good glass forming and low volume change during crystallization makes highly crystalline bodies containing Ba-osumilite prepared via devitrifying frits or internal nucleation comparatively easy to manufacture.

The following compositions suitable for achieving the above objectives are based upon the discovery that $Mg^{+2}$ ions can substitute into inter-ring tetrahedral sites in the osumilite structure customarily occupied by $Al^{+3}$ ions. To secure charge balance, some of the tetrahedral ring sites normally filled by $Al^{+3}$ will be replaced with $Si^{+4}$. $Ca^{+2}$ and $Sr^{+2}$ can be substituted in part for $Ba^{+2}$ and it is believed that $Ca^{+2}$ and $Zn^{+2}$ can also replace part of the $Mg^{+2}$ in the osumilite structure. Presumably, $Ca^{+2}$ and $Zn^{+2}$ enter the A lattice position but it is possible that $Zn^{+2}$, which is known to occur in tetrahedral coordination, can enter the T(1) position. In addition, it is conjectured that $Fe^{+2}$ and $Mn^{+2}$ are capable of replacing some of the $Mg^{+2}$, and $Fe^{+3}$ may enter tetrahedral positions, replacing $Al^{+3}$ and/or $Si^4$. $Ca^{+2}$ ions help to stabilize osumilite relative to cordierite, because it will not enter the crystal structure of cordierite.

Laboratory experimentation has demonstrated that, when glasses are crystallized having the stoichiometry of half-stuffed Ba-osumilite, viz.,

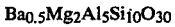

cordierite, rather than osumilite, is a major phase developed. The cordierite crystallization creates two serious problems: first, because it is low in $SiO_2$ relative to the osumilite composition and the composition of the original glass, it results in a larger proportion of residual siliceous glass in the matrix of the final glass-ceramic which allows the body to creep at relatively low temperatures; and, second, since crystallization of cordierite produces a significant volume increase as it crystallizes from the parent glass, cracking may be hazarded, particularly in silicon-nucleated glass-ceramics where crystallization occurs when the glass is at a high viscosity.

It has been discovered that the following substitution, viz., $$0.5Mg^{+2} + 0.5Si^{+4} \rightleftarrows Al^{+3}$$

in the half-stuffed osumilite structure stabilizes that phase relative to the undesired cordierite. Accordingly, in glasses having the appropriate osumilite stoichiometry, the resulting crystallization contains very little, if any, cordierite.

The completely-stuffed and half-stuffed osumilites with that substitution have the following respective stoichiometries:

$$BaMg_{2.5}Al_5Si_{9.5}O_{30} \text{ and}$$

$$Ba_{0.5}Mg_{2.5}Al_4Si_{10.5}O_{30}$$

It is not possible to conduct this substitution beyond the points $$BaMg_3Al_4Si_9O_{30} \text{ and}$$

$$Ba_{0.5}Mg_3Al_3Si_{11}O_{30},$$

because at these stoichiometries it is difficult to produce highly crystalline bodies. It appears that only about one-half of the T(2) tetrahedral inter-ring sites can be occupied by $Mg^{+2}$.

Highly crystalline glass-ceramic bodies satisfying the above objectives can be produced from base glass compositions consisting essentially, expressed in terms of weight percent on the oxide basis, of about

| SiO$_2$ | 51–68 |
| Al$_2$O$_3$ | 17.5–30 |
| MgO | 5–12 |
| BaO | 3.5–15 |
| Si | 0–1 |
| Nb$_2$O$_5$ | 0–20 |
| Ta$_2$O$_5$ | 0–10 |
| TiO$_2$ | 0–12 |
| ZrO$_2$ | 0–6 |

In like manner to the description of Ser. No. 380,464, the oxidation resistance of the inventive materials appears to be somewhat improved through the inclusion of about 0.5–3% As$_2$O$_3$. However, contrary to that disclosure, the presence of Nb$_2$O$_5$ and/or Ta$_2$O$_5$ is not necessary in the present inventive compositions to provide in situ protection from SiC-glass interaction, i.e., their inclusion is not required to restrict active oxidation of the SiC fibers at elevated temperatures and to inhibit SiC-glass interfacial reactivity. Up to about 15% total of the following divalent metal oxides may be included in the indicated proportions of 0–4% CaO, 0–12% SrO, and 0–10% ZnO. Minor amounts of other compatible metal oxides may be added, e.g., refractory metal oxides such as WO$_3$ and MoO$_3$ or conventional transition metal oxide or rare earth oxide colorants in customary amounts. Nevertheless, to insure the desired development of highly crystalline, Ba-osumilite bodies exhibiting exceptional use temperatures, the sum of all additions to the base quaternary system, exclusive of any nucleating agent present, will not exceed about 15%.

The alkali metal oxides will desirably be totally absent from the compositions.

Where a glass-ceramic article is to be crystallized in situ through internal nucleation and crystallization of a precursor glass body, i.e., not formed from glass frit, the nucleants, when utilized individually, will be employed in the minimum amounts of 10% Nb$_2$O$_5$, 5% TiO$_2$, and 0.1% silicon metal. The preferred levels of silicon metal vary between about 0.2–0.5%.

In those instances where the crystalline body is to be prepared via firing glass frit, the compositions of the base glass will be so designed that the mole ratio Al$_2$O$_3$:(MgO+BaO+SrO) will most desirably be less than 1. However, if CaO should be present in amounts greater than 1% by weight, then the above mole ratio may be higher; i.e., it may be equal to or even greater than unity.

The complete absence of ZnO is preferred where silicon nucleation is to be utilized in order to preclude a reaction between those two ingredients resulting in the production of SiO$_2$ and Zn. BaO will most desirably be included in amounts in excess of 5% by weight where silicon nucleation is to be used and the glass batch is melted in air or under other atmospheres which react with silicon, because BaO appears to retard gaseous diffusion in the molten glass and, hence, inhibits oxidation of or other reaction with the silicon nuclei except at the very surface.

In general, a temperature of at least 800° C. has been found necessary to develop the desired crystallization. The maximum temperature suitable for crystallization will be dependent upon the composition of the precursor glass. However 1325° C. has been deemed to constitute a practical top temperature.

PRIOR ART

U.S. Pat. No. 3,573,939 describes the production of glass-ceramic articles consisting essentially of crystals selected from the group of LiTaO$_3$, beta-spodumene solid solution, and $\beta$-Ta$_2$O$_5$ nucleated with Ta$_2$O$_5$ and, optionally, Nb$_2$O$_5$. The base glasses therefor consisted essentially, expressed in weight percent on the oxide basis, of about 2–7% Li$_2$O, 0–25% Al$_2$O$_3$, 10–60% SiO$_2$, and 20–80% Ta$_2$O$_5$+Nb$_2$O$_5$, wherein Nb$_2$O$_5$ is present in an amount up to 20%. The base compositions and the final products are far removed from the instant invention. There is no mention of osumilite.

U.S. Pat. No. 3,713,854 discloses the production of glass-ceramic articles employing 0.15–2% by weight silicon metal as the nucleating agent. A wide variety of crystal phases is described but nowhere is Ba-osumilite mentioned and none of the 26 working examples provided has a composition which could be crystallized in situ to yield Ba-osumilite.

U.S. Pat. No. 3,839,053 is concerned with the production of glass-ceramic articles containing crystals selected from the group of zinc petalite solid solution and beta-quartz solid solution nucleated with ZrO$_2$ and, optionally, TiO$_2$. The base compositions therefor consisted essentially, expressed in terms of weight percent on the oxide basis, of 10–20% ZnO, 12–20% Al$_2$O$_3$, 1–10% Ta$_2$O$_5$, 50–65% SiO$_2$, and 2–8% ZrO$_2$. There is no mention of Ba-osumilite and the compositions are quite remote from the instant invention.

DESCRIPTION OF PREFERRED EMBODIMENTS

Table I records glass compositions, expressed in terms of parts by weight on the oxide basis, which, when crystallized in situ, will contain Ba-osumilite with or without other crystal phases. Inasmuch as the sum of the components totals or closely approximates 100, for all practical purposes the levels reported may be deemed to reflect weight percent. The actual batch ingredients may comprise any materials, either the oxides or other compounds, which, when melted together, will be converted into the desired oxides in the proper proportions.

The batch ingredients were compounded, ballmilled together to aid in obtaining a homogeneous melt, and deposited into silica or alumina crucibles. The silicon metal was added as a powder finer than a No. 100 United States Standard Sieve (149 microns). The crucibles were covered, introduced into a furnace operating at about 1600° C., and the batches melted for about 6 hours. Glass bodies were prepared from the melts in two ways. Examples 1–9, containing no silicon metal, were poured as a relatively fine stream into a container of water to produce finely-divided particles of glass which, after drying, were comminuted to form a frit passing a No. 325 United States Standard Sieve (44 microns). Examples 10–14 and 16–18, containing silicon metal as a nucleant, were poured into steel molds to yield slabs having dimensions of about 8"×10"×1" and those slabs were immediately transferred to an annealer operating at about 820° C. Examples 19–27, containing $TiO_2$, $ZrO_2$, and/or $Nb_2O_5$ as nucleants, were poured into steel molds to form slabs about 6"×6"×0.5", and those slabs were transferred to an annealer operating at about 800° C. Cylinders and cones of glass about 0.25" in thickness were centrifugally cast and pressed from Example 15. It will be appreciated that the above-described melting and forming procedures are illustrative of laboratory practice and that the compositions of Table I can be melted and formed utilizing commercial glass melting and forming techniques.

TABLE I (Parts by Weight)

| | 1 | 2 | 3 | 4 | 5 | 6 | 7 | 8 | 9 |
|---|---|---|---|---|---|---|---|---|---|
| $SiO_2$ | 53.6 | 51.8 | 64.4 | 52.9 | 55.6 | 67.5 | 54.5 | 51.8 | 52.0 |
| $Al_2O_3$ | 18.2 | 23.2 | 23.5 | 23.6 | 18.9 | 18.3 | 26.8 | 27.5 | 27.5 |
| MgO | 7.2 | 7.3 | 8.2 | 9.3 | 11.2 | 10.3 | 5.7 | 5.6 | 6.6 |
| BaO | 13.5 | 14.0 | 3.9 | 14.2 | 14.2 | 3.9 | 10.4 | 12.5 | 12.3 |
| CaO | — | — | — | — | — | — | 2.7 | 2.6 | 1.3 |
| ZnO | 7.3 | 3.7 | — | — | — | — | — | — | — |

| | 10 | 11 | 12 | 13 | 14 | 15 | 16 | 17 | 18 |
|---|---|---|---|---|---|---|---|---|---|
| $SiO_2$ | 59.3 | 54.8 | 52.2 | 62.2 | 65.3 | 61.2 | 55.9 | 56.7 | 52.2 |
| $Al_2O_3$ | 25.2 | 26.8 | 27.6 | 20.2 | 19.0 | 20.6 | 22.6 | 24.1 | 27.6 |
| MgO | 8.0 | 7.7 | 7.6 | 10.0 | 10.0 | 9.9 | 9.5 | 8.8 | 7.6 |
| BaO | 7.6 | 11.0 | 12.6 | 7.6 | 5.7 | 8.3 | 12.0 | 10.4 | 12.6 |
| Si | 0.4 | 0.4 | 0.4 | 0.2 | 0.2 | 0.2 | 0.2 | 0.2 | 0.2 |

| | 19 | 20 | 21 | 22 | 23 | 24 | 25 | 26 | 27 |
|---|---|---|---|---|---|---|---|---|---|
| $SiO_2$ | 50.0 | 50.0 | 50.0 | 50.0 | 57.4 | 57.4 | 59.3 | 59.3 | 62.3 |
| $Al_2O_3$ | 28.3 | 28.3 | 28.3 | 28.3 | 22.0 | 22.0 | 25.2 | 25.2 | 20.2 |
| MgO | 7.5 | 7.5 | 7.5 | 7.5 | 9.4 | 9.4 | 8.0 | 8.0 | 10.0 |
| BaO | 14.2 | 14.2 | 14.2 | 14.2 | 11.0 | 11.0 | 7.6 | 7.6 | 7.6 |
| $TiO_2$ | 5.0 | 6.0 | — | 6.0 | — | 6.0 | 6.0 | 6.0 | 8.0 |
| $ZrO_2$ | — | — | 4.0 | 3.0 | — | — | 2.0 | 6.0 | — |
| $Nb_2O_5$ | — | — | 10.0 | 5.0 | 20.0 | 5.0 | 2.0 | 2.0 | — |
| $As_2O_3$ | 0.5 | 0.5 | 0.5 | 0.5 | 0.5 | 0.5 | 0.5 | 0.5 | 0.8 |

Bars of the proper size for conducting measurements of coefficient of thermal expansion were cold pressed from Examples 1–9 and bars of like size were cut from the annealed slabs of Examples 10–14 and 16–18. Those test specimens, plus the cylinders and cones of Example 15 were moved to an electrically-fired furnace and subjected to the heat treatment schedules recorded in Table II. The temperature of each sample was raised at a rate of about 5° C./minute to the levels cited. Upon completion of the heat treatment, the electric current to the furnace was cut off and the crystallized specimens left inside the furnace and allowed to cool to room temperature thereon. That practice, termed "cooling at furnace rate", has been estimated to average about 3°–5° C./minute.

Table II also reports a visual description of the original glass and the crystalline body, an identification of the crystal phases present in each as determined via X-ray diffraction analyses (the phase listed first being predominant), and a measurement of the coefficient of thermal expansion ($\times 10^{-7}$/°C.) of each over a particular range of temperatures.

TABLE II

| Example | Glass Appearance | Heat Treatment | Glass-Ceramic Appearance | Crystal Phases | Coef. of Expansion |
|---|---|---|---|---|---|
| 1 | Clear | Hold at 1120° C. for 4 hours | White | Ba-osumilite, Cordierite | (0°–300° C.) 30 |
| 2 | Clear | Hold at 1120° C. for 4 hours | White | Ba-osumilite, Cordierite | (0°–800° C.) 26.1 |
| 3 | Clear | Hold at 1200° C. for 0.5 hour | White | Ba-osumilite | (0°–800° C.) 12.8 |
| 4 | Clear | Hold at 1200° C. for 0.5 hour | White | Ba-osumilite Cordierite | (0°–300° C.) 20 |
| 5 | Clear | Hold at 1200° C. for 0.5 hour | White | Ba-osumilite, Glass | (0°–300° C.) 45 |
| 6 | Clear | Hold at 1200° C. for 0.5 hour | White | Ba-osumilite | (0°–300° C.) 25 |
| 7 | Clear | Hold at 1200° C. for 4 hours | White | Ba-osumilite | (0°–800° C.) 23.4 |
| 8 | Clear | Hold at 1200° C. for 4 hours | White | Ba-osumilite, Glass | (0°–300° C.) 28 |
| 9 | Clear | Hold at 1200° C. for 4 hours | White | Ba-osumilite | (0°–300° C.) 25 |
| 10 | Gray-black | Hold at 840° C. for 2 hours | Dark gray | Ba-osumilite, Cordierite | (0°–300° C.) 20 |
| 11 | Gray-black | Hold at 840° C. for 2 hours | Dark gray | Ba-osumilite, Cordierite | (0°–300° C.) 25 |

TABLE II-continued

| Example | Glass Appearance | Heat Treatment | Glass-Ceramic Appearance | Crystal Phases | Coef. of Expansion |
|---|---|---|---|---|---|
| 12 | Gray-black | Hold at 840° C. for 2 hours | Dark gray | Ba-osumilite, Cordierite | (0°–100° C.) 23.5 |
| 13 | Gray-black | Hold at 900° C. for 2 hours Hold at 1300° C. for 4 hours | Dark gray | Ba-osumilite, Cordierite | (0°–900° C.) 20 |
| 14 | Gray-black | Hold at 900° C. for 2 hours Hold at 1300° C. for 4 hours | Light gray skin, cherty interior | Ba-osumilite, Cordierite, Glass | (0°–900° C.) 28 |
| 15 | Gray-black | Hold at 900° C. for 2 hours Hold at 1260° C. for 4 hours | Dark gray, cherty fracture | Ba-osumilite, Cordierite | (0°–900° C.) 18 |
| 16 | Gray-black | Hold at 900° C. for 2 hours Hold at 1200° C. for 4 hours | Dark gray, cherty fracture | Ba-osumilite, Cordierite | (0°–900° C.) 22.5 |
| 17 | Gray-black | Hold at 900° C. for 2 hours Hold at 1260° C. for 4 hours | Dark gray, some cracking | Ba-osumilite Cordierite | — |
| 18 | Gray-black | Hold at 900° C. for 2 hours Hold at 1260° C. for 4 hours | Dark gray, cracking | Cordierite, Ba-osumilite | — |
| 19 | Clear, amber | Hold at 800° C. for 2 hours Hold at 1200° C. for 2 hours | Light gray, deformed, surface crystallized, coarse crystals | Ba-osumilite | — |
| 20 | Clear, amber | Hold at 800° C. for 2 hours Hold at 1200° C. for 2 hours | Light gray, deformed, internally crystallized, coarse crystals | Ba-osumilite, Cordierite | 25°–700° C. 28 |
| 21 | Clear, green amber | Hold at 800° C. for 2 hours Hold at 1200° C. for 2 hours | Beige surface, white interior, fine-grained, surface compression | Ba-osumilite, Glass | 0°–800° C. 27 |
| 22 | Clear, amber | Hold at 800° C. for 2 hours Hold at 1200° C. for 2 hours | White, deformed, fine-grained, surface compression | Ba-osumilite Glass | — |
| 23 | Clear, green amber | Hold at 750° C. for 2 hours Hold at 1150° C. for 2 hours | Beige, deformed, very fine-grained | Ba-osumilite | — |
| 24 | Clear, greenish amber | Hold at 750° C. for 2 hours Hold at 1150° C. for 2 hours | Off-white, very fine-grained | Ba-osumilite, glass, $TiO_2$—$Nb_2O_5$ solid solution | — |
| 25 | Clear, amber | Hold at 750° C. for 2 hours Hold at 1250° C. for 2 hours | Off-white, deformed, medium-to-coarse grained | Ba-osumilite, Cordierite | 0°–700° C. 21.5 |
| 26 | Clear, amber | Hold at 750° C. for 2 hours Hold at 1250° C. for 2 hours | Off-white, medium-to-coarse grained | Ba-osumilite, Cordierite, Glass, $TiO_2$—$Nb_2O_5$ solid solution | 0°–700° C. 26.8 |
| 27 | Clear, amber | Hold at 800° C. for 4 hours Hold at 1200° C. for 4 hours | White, fine-grained, dull surface | Cordierite, Ba-osumilite, Rutile, Glass | — |

The proportion of cordierite is high in Example 17 and is predominant in Examples 18, 26 and 27. The cracking observed in Examples 17 and 18 illustrates the phenomenon that cordierite produces expansion as it crystallizes from glass, especially in silicon-nucleated glass-ceramic bodies. A comparison of Example 12 with Example 18, however, is of interest. The base composition of each is identical but the heat treatment of Example 12 is at a considerably lower temperature and the amount of nucleant therein is twice that of Example 18. Those two factors provided a crack-free, crystallized article wherein Ba-osumilite, rather than cordierite, constituted the predominant phase. A comparison of Example 25 with Example 26 demonstrates that the effect of high nucleant content is to develop cordierite in favor of Ba-osumilite. The development of cordierite in Example 27 is believed to indicate the efficiency of $TiO_2$ as a nucleant.

Overall, the final products were highly crystalline, i.e., greater than 50% by volume and frequently in excess of 90%. The dielectric constant and loss tangent measured at 25° C. and at 8.6 GHz were 5.3 and 0.0003, respectively. Those electrical properties strongly recommend their utility in the fabrication of radomes.

Table III lists another group of precursor glass compositions, expressed in terms of parts by weight on the oxide basis, illustrating further features of the inventive materials. Again, the sum of the individual components totals or closely approximates 100 so the values presented can reasonably be considered to reflect weight percent. Examples 27–30 and 36–38 are based upon fully-stuffed Ba-osumilite; Examples 31–35 represent half-stuffed Ba-osumilite; Example 39 reflects ¾-stuffed Ba-osumilite; and Example 40 is a barium-containing cordierite.

The batch ingredients were compounded, ballmilled together, melted, and the melts fritted in like manner to examples 1–9 above. Cylinders having a diameter of 0.5" were prepared by cold pressing the frit at 1000 psi to yield an unfired density of about 50%.

TABLE III

|  | 28 | 29 | 30 | 31 | 32 | 33 | 34 | 35 | 36 | 37 | 38 | 39 | 40 |
|---|---|---|---|---|---|---|---|---|---|---|---|---|---|
| $SiO_2$ | 49.7 | 48.2 | 47.3 | 58.9 | 57.2 | 56.1 | 62.3 | 60.8 | 51.4 | 50.0 | 52.8 | 51.4 | 41.3 |
| $Al_2O_3$ | 28.1 | 27.3 | 26.8 | 25.0 | 24.3 | 23.8 | 20.2 | 22.7 | 26.0 | 28.3 | 23.6 | 25.3 | 35.1 |
| MgO | 7.4 | 7.2 | 7.1 | 7.9 | 7.7 | 7.5 | 10.0 | 9.0 | 8.4 | 7.5 | 9.3 | 7.3 | 12.3 |
| BaO | 14.1 | 13.7 | 13.4 | 7.5 | 7.3 | 7.2 | 7.6 | 7.6 | 14.2 | 14.2 | 14.2 | 10.4 | 5.7 |
| $As_2O_3$ | 0.7 | 0.7 | 0.7 | 0.7 | 0.7 | 0.7 | — | — | — | — | — | 0.9 | 0.7 |
| $Nb_2O_5$ | — | 3.0 | — | — | 3.0 | — | — | — | — | — | — | — | — |
| $Ta_2O_5$ | — | — | 5.0 | — | — | 5.0 | — | — | — | — | — | 4.7 | 5.0 |
| Si | — | — | — | — | — | — | — | — | — | 0.4 | — | — | — |

Table IV reports heat treatments to which the above-described cylinders were subjected. Good sinterability is of interest because it renders fabrication of articles at relatively low temperatures possible (~1000° C. at a pressure ~1000 psi). Also, exposures to high temperature hazard reactions occurring between the glass-ceramic matrix and reinforcing elements embedded therein. Table IV records shrinkages (% linear) observed in the cylinders of Examples 28-33, 39, and 40 after firing at 900° C. and 1000° C. for 0.5 hour. Each specimen was then fired at 1200° C. for one hour to cause crystallization in situ. Table IVA reports shrinkages (% linear) noted in the cylinders of Examples 34-38 after firing at 1025° C. for 0.25 hour. Thereafter, each specimen was fired at 1260° C. for 0.25 hour to effect crystallization in situ.

The precursor glasses were essentially clear and colorless and the glass-ceramics were white. The crystal phases present in each sample, as identified through X-ray diffraction analysis, are also reported in Table IV, the phases being recorded in the order of amount present. Some cracking was observed in the crystalline product of Examples 31-35 and rather extensive cracking in Example 40. The compositions again illustrate that cordierite produces expansion as it crystallizes from a glass.

No cracking was discerned in Examples 28-30, 37 and 38 (fully-stuffed Ba-osumilite glass-ceramics) and Example 39 (¾-stuffed Ba-osumilite glass-ceramic). No distortion was noted when bodies of those stoichiometries were exposed to temperatures of 1300° C.

TABLE IV

| Example | % Shrinkage 900° C. - 0.5 hour | % Shrinkage 1000° C. - 0.5 hour | Crystal Phases |
| --- | --- | --- | --- |
| 28 | 8.3 | 15.8 | Ba-osumilite Cordierite Celsian |
| 29 | 14.2 | 15.9 | Ba-osumilite Cordierite Celsian |
| 30 | 11.7 | 16.5 | Ba-osumilite Cordierite Celsian |
| 31 | 6.7 | 16.5 | Cordierite Ba-osumilite Glass |
| 32 | 9.5 | 16.7 | Cordierite Ba-osumilite Glass |
| 33 | 5.1 | 16.9 | Cordierite Ba-osumilite Glass |
| 39 | 10.1 | 16.0 | Ba-osumilite Cordierite |
| 40 | 16.1 | 16.1 | Cordierite Glass |

TABLE IVA

| Example | % Shrinkage | Crystal Phases |
| --- | --- | --- |
| 34 | 15.6 | Ba-osumilite, Cordierite |
| 35 | 15.4 | Cordierite, Ba-osumilite |
| 36 | 14.0 | Ba-osumilite, Cordierite |
| 37 | 14.0 | Ba-osumilite |
| 38 | 14.0 | Ba-osumilite |

As can be discerned from Tables IV and IVA, the linear shrinkage ranges from 14.0-16.9%, thus indicating substantially complete densification. This study of the shrinkage character of the inventive materials signifies that 900°-1000° C. would comprise an operable hot pressing temperature range.

It will be appreciated that the inventive materials readily lend themselves to conventional hot pressing techniques. Hence, a range of temperatures and pressures can be contemplated, the critical criterion being that the forming is undertaken at a temperature at which the glass exhibits a viscosity between about $10^8-10^{12}$ poises. As is well-recognized, the forming pressure required to shape a body will be greater where the viscosity of the glass is greater. Stated in another manner, as the temperature of the glass is raised, the load applied for pressing can be reduced.

To illustrate the utility of the inventive materials as matrices for reinforcing elements, about 33.3% by weight glass powders of Examples 30, 33, and 40 were mixed into a solution consisting of about 60-67% by weight $H_2O$, 29-36% triethylene glycol, and 4% by weight polyvinyl alcohol to form a slurry. A yarn of SiC fibers was immersed into the solution to achieve impregnation and then wrapped on a drum to form a mat having unidirectional fiber orientation. The mat was dried at room temperature, three-inch diameter discs cut therefrom, the discs stacked into a graphite mold, and the organic binder burned out in a furnace operating at about 350° C. and having a reducing atmosphere of forming gas. (It will be appreciated that other organic binders and burnout procedures can be satisfactorily utilized.)

The mold was then transferred to a resistance-heated press and consolidated at the sintering temperature reported in Table V utilizing a 1500 psi uniaxial load and a vacuum environment. The heating schedule involved: rapid heatup (~43° C./minute) to 650° C., hold for 15 minutes; heat up to the sintering temperature at about 5° C./minute, the load being applied when a temperature of about 800° C. was reached; hold at the sintering temperature for 30 minutes; fill the press chamber with argon and cut off the electric current to permit cooling at furnace rate (~3°-5° C./minute), the load being released when the temperature reached about 800° C.

Similar SiC fiber reinforced discs were prepared from Examples 34-38 in like manner to the above description. However, a different SiC yarn was employed and no load was applied to the press until after the mold had reached the maximum temperature for about five minutes.

In both practices, the discs were extricated from the molds, ground flat and parallel, and then cut into about 0.2" wide strips parallel to the direction of the fibers. Strips of several discs were exposed to a second heat treatment in air to investigate the efect thereof upon the mechanical strength of the composite. Modulus of rupture measurements were undertaken on each sample using a three-point bend test apparatus. Failure modes were classified as brittle (planar fracture surface, no fiber pull-out), woody (splintery fracture surface, <0.5 mm fiber pull-out), or brushy (individual fibers exposed, >0.5 mm fiber pull-out). The brushy failure mode correlated with the highest fracture energy.

Compositions 30, 33, and 40 represent composite articles containing 20-25% by volume of SiC fibers, whereas the composits bodies prepared from Examples 34-38 contained about 40% by volume SiC fibers. Increasing the volume percentage of fibers can be expected to increase the mechanical strength of the composite.

TABLE V

| Example | Pressing Temperature | Additional Heat Treatment | Modulus of Rupture (psi) | Failure |
|---|---|---|---|---|
| 30 | 1000° C. | — | 41,000 | Brushy |
| 30 | 1000° C. | 5° C./min. to 1200° C. Hold for 1 hour | 51,000 | Brushy |
| 30 | 1000° C. | 5° C./min. to 1320° C. Hold for 2 hours | 66,000 | Brushy |
| 33 | 960° C. | — | 24,000 | Brittle |
| 33 | 960° C. | Immediate exposure to 1200° C. Hold for 1 hour | 26,000 | Brittle |
| 40 | 960° C. | — | 25,000 | Brittle, irregular |
| 40 | 960° C. | Immediate exposure to 1000° C. Hold for 1 hour | 15,000 | Brittle, irregular |
| 40 | 960° C. | 5° C./min. to 1000° C. Hold for 1 hour | 30,000 | Woody |
| 34 | 1350° C. | — | 52,100 | Brushy |
| 35 | 1350° C. | — | 40,900 | Woody |
| 36 | 1350° C. | — | 39,000 | Brittle |
| 37 | 1400° C. | — | 36,000 | Brittle |
| 38 | 1350° C. | — | 36,400 | Brittle |

As can be observed from Table V, both the half-stuffed barium osumilite matrix (Example 33) and the cordierite matrix (Example 40) produced relatively weak brittle composites in the as-pressed state. There was no visible evidence of fiber degradation and it is believed that the brittleness is due to very tight bonding between the fiber and matrix. The mechanism underlying that tight bonding has not been fully explained, but has been theorized to be either the result of a reaction between the fiber and the matrix or the thermal expansion mismatch existing between the fiber and the matrix. Each of the composites of Examples 33 and 40 exhibited some bloating and distortion after the subsequent heat treatment. It was noted, however, that the programmed heating appeared to result in a less brittle fracture than when the specimen was plunged into a preheated furnace.

In contrast, the fully-stuffed Ba-osumilite composite article (Example 30) displayed moderate mechanical strength in the as-pressed state with a very tough failure and a brushy fracture surface. No bloating or distortion was noted, although a minor amount of bubbly glaze formed on the surface of the article during the 1320° C. heat treatment. The strength of the composite improved significantly after each supplemental heat treatment and the tough failure mode and brushy fracture surface were not altered by the subsequent heat treatments. In sum, Example 30 illustrates that fully-stuffed Ba-osumilite glass-ceramic bodies can be employed as matrices for SiC fibers for use in applications subject to temperatures of 1300° C. and higher.

Another advantage which the Ba-osumilite compositions display over cordierite compositions is the broader temperature range wherein good working (melting and forming) viscosities can be obtained.

The SiC yarn employed with Examples 34–38 contained a high proportion of oxygen, viz., up to about 17 mole percent. That factor is believed to have contributed to the general brittleness and weakness of the composites.

Composite articles may be prepared from carbon (graphite) fiber mats and frits capable of being converted to fully-stuffed Ba-osumilite glass-ceramics in like manner to that described above with SiC fibers. Thus, similarly to the situation with respect to SiC fibers, it is believed that essentially no reaction occurs between the graphite fibers and the inventive glass-ceramic materials. $TiO_2$ will preferably be essentially absent from the glass-ceramic compositions when SiC fibers constitute the reinforcing elements. $TiO_2$ is believed to form titanium silicide intermetallic compounds at the interface of the SiC fiber matrix interface, thereby resulting in reduced fracture toughness in the composite. No such reaction occurs with $TiO_2$ and carbon fibers. About 5–8% $TiO_2$ will perform very satisfactorily to nucleate a matrix containing carbon fibers.

We claim:

1. A glass-ceramic body exhibiting high strength and a use temperature up to 1300° C. and higher, wherein Ba-osumulite constitutes the predominant crystal phase, consisting essentially, expressed in terms of weight percent on the oxide basis, of

| | |
|---|---|
| $SiO_2$ | 51–68 |
| $Al_2O_3$ | 17.5–30 |
| MgO | 5–12 |
| BaO | 3.5–15 |
| Si | 0–1 |
| $Nb_2O_5$ | 0–20 |
| $Ta_2O_5$ | 0–10 |
| $TiO_2$ | 0–12 |
| $ZrO_2$ | 0–6 |

2. A glass-ceramic body according to claim 1 also containing up to 15% total of the following materials in the indicated proportions of 0–3% $As_2O_3$, 0–4% CaO, 0–12% SrO, and 0–10% ZnO.

3. A glass-ceramic body according to claim 1 which is crystallized in situ through internal nucleation and crystallization of a precursor glass body containing at least one nucleant selected from the group in at least the indicated minimum proportion of 0.1% Si, 10% $Nb_2O_5$, and 5% $TiO_2$.

4. A glass-ceramic according to claim 2 prepared by firing a finely-divided, precursor glass frit wherein the mole ratio $Al_2O_3$: (MgO+CaO+ZnO+BaO+SrO)<1.

5. A glass-ceramic body according to claim 2 prepared by firing a finely-divided, precursor glass frit containing more than 1% CaO and wherein the mole ratio $Al_2O_3$:(MgO+BaO+SrO) may be $\geq 1$.

* * * * *